United States Patent
Khan

(10) Patent No.: US 9,249,777 B2
(45) Date of Patent: Feb. 2, 2016

(54) WIND TURBINE ROTOR AND METHODS OF ASSEMBLING THE SAME

(71) Applicant: General Electric Company, Schenectady, NY (US)

(72) Inventor: Zaeem Ashraf Khan, Albany, NY (US)

(73) Assignee: General Electric Company, Niskayuna, NY (US)

( * ) Notice: Subject to any disclaimer, the term of this patent is extended or adjusted under 35 U.S.C. 154(b) by 528 days.

(21) Appl. No.: 13/683,734

(22) Filed: Nov. 21, 2012

(65) Prior Publication Data

US 2014/0140851 A1    May 22, 2014

(51) Int. Cl.
*F03D 1/06* (2006.01)

(52) U.S. Cl.
CPC ............ *F03D 1/0666* (2013.01); *F03D 1/0625* (2013.01); *F03D 1/0691* (2013.01); *Y02E 10/721* (2013.01)

(58) Field of Classification Search
CPC ... F03D 1/0625; F03D 1/0666; F03D 1/0691; Y02E 10/721
See application file for complete search history.

(56) References Cited

U.S. PATENT DOCUMENTS

| | | | |
|---|---|---|---|
| 4,421,458 A | 12/1983 | Allan et al. | |
| 4,735,552 A | 4/1988 | Watson | |
| 6,951,443 B1 | 10/2005 | Blakemore | |
| 7,713,028 B2 | 5/2010 | Liao | |
| 7,939,961 B1 | 5/2011 | Bonnet | |
| 8,092,182 B2 | 1/2012 | Radisek | |
| 8,123,478 B2 | 2/2012 | Ahmann | |
| 8,142,164 B2 | 3/2012 | Rao et al. | |
| 2007/0114798 A1 | 5/2007 | Cairo | |
| 2009/0148291 A1* | 6/2009 | Gerber et al. | 416/147 |
| 2009/0208337 A1* | 8/2009 | Chambers et al. | 416/210 R |

FOREIGN PATENT DOCUMENTS

| | | |
|---|---|---|
| JP | 2005 282451 A | 10/2005 |
| WO | 2005/111413 A1 | 11/2005 |
| WO | 2010/040829 A2 | 4/2010 |
| WO | 2011131923 A1 | 10/2011 |

OTHER PUBLICATIONS

Sizemore et al., "Structural Analysis and Cost Estimate of an Eight-Leg Space Frame as a Support Structure for Horizontal Axis Wind Turbines", NASA, Oct. 1983.
Goude et al., "A Parameter Study of the Influence of Struts on the Performance of a Vertical-axis Marine Current Turbine", Uppsala University, 2009.
Garvey, "Structural Capacity and the 20 MW Wind Turbine", Journal of Power and Energy, Jan. 26, 2010.
International search report issued in connection with PCT/US2013/070883, Feb. 17, 2014.

* cited by examiner

*Primary Examiner* — Igor Kershteyn
(74) *Attorney, Agent, or Firm* — Francis T. Coppa

(57) ABSTRACT

A rotor for coupling to a shaft is provided. The rotor includes a space frame hub having a central portion coupled to the shaft and a first structural member coupled to said central portion, wherein the first structural member has a first length. The rotor further includes a first blade coupled to the first structural member and having a tip end spaced from the shaft at a second length that is longer than the first length.

20 Claims, 7 Drawing Sheets

WIND TURBINE ROTOR AND METHODS OF ASSEMBLING THE SAME

BACKGROUND OF THE DISCLOSURE

The embodiments described herein relate generally to wind turbines, and more particularly, to methods and systems for improving efficiency of a wind turbine rotor.

Some wind turbines may include a cast iron hub coupled to a shaft of a wind turbine, wherein the blades are coupled to the hub. More particularly, conventional wind turbine rotors may use a three-bladed configuration wherein root ends of the blades are coupled to the hub. These root ends, however, may not be aerodynamically shaped and may not produce power from the wind. More particularly, a portion of the blade near the root end may not produce any appreciable aerodynamic lift.

In order to reach higher energy conversion, the aerodynamic efficiency of the wind turbine may be improved by increasing the blade size of the wind turbine. Increasing the blade size, however, usually involves increasing the size of other components and machinery of the wind turbine which may lead to higher wind turbine costs. More particularly, transportation costs, fabrication costs and/or installation costs can increase for larger sized blades. Moreover, increasing the blade size may result in a higher load on a pitch assembly and a yaw assembly, and in particular, the respective bearings of these assemblies due to bending moments and/or thrust forces created by large rotor blades. More particularly, bending moments and/or thrust forces can override the charging limit of typical bearings.

Moreover, due to the aerodynamic loads experienced during operations, larger blades may experience flap and in-plane bending moments at the root ends which may reduce efficiency of the wind turbine. Aerodynamic loads may cause deflection at the tip ends of large blades, wherein excessive tip deflection can be catastrophic if the blades contact the wind turbine tower.

BRIEF DESCRIPTION OF THE DISCLOSURE

In one aspect, a rotor for coupling to a shaft is provided. The rotor includes a space frame hub having a central portion coupled to the shaft and a first structural member coupled to the central portion, wherein the first structural member has a first length. The rotor further includes a first blade coupled to the first structural member and having a tip end spaced from the shaft at a second length that is longer than the first length.

In another aspect, a wind turbine is provided. The wind turbine includes a tower; a nacelle coupled to the tower; a shaft coupled to the nacelle; and a rotor coupled to the tower. The rotor includes a space frame hub having a central portion coupled to the shaft. A plurality of structural members is coupled to the central portion, wherein each member of the plurality of structural members has a first length. The rotor further includes a plurality of blades, wherein each blade of the plurality of blades is coupled to a respective portion of the plurality of portions and each blade has a tip end spaced from the shaft at a second length that is longer than the first length. A pitch assembly is coupled to each portion of the plurality of portions and to each blade of the plurality of blades.

In another aspect, a method of assembling a rotor to a shaft is provided. The method includes radially coupling a space frame portion to a space frame central portion; coupling a pitch assembly to the space frame portion; coupling a blade to the space frame portion and the pitch assembly; and coupling the space frame central portion to the shaft.

DETAILED DESCRIPTION OF THE DISCLOSURE

The embodiments described herein relate to wind turbines and methods of assembling a wind turbine. More particularly, the embodiments relate to a rotor that is configured to facilitate minimizing bending moments of the rotor blades and minimizing tip deflection of the rotor blades. It should be understood that the embodiments described herein for rotors are not limited to wind turbines, and should be further understood that the descriptions and figures that utilize a rotor and a wind turbine are exemplary only.

Figure 1:
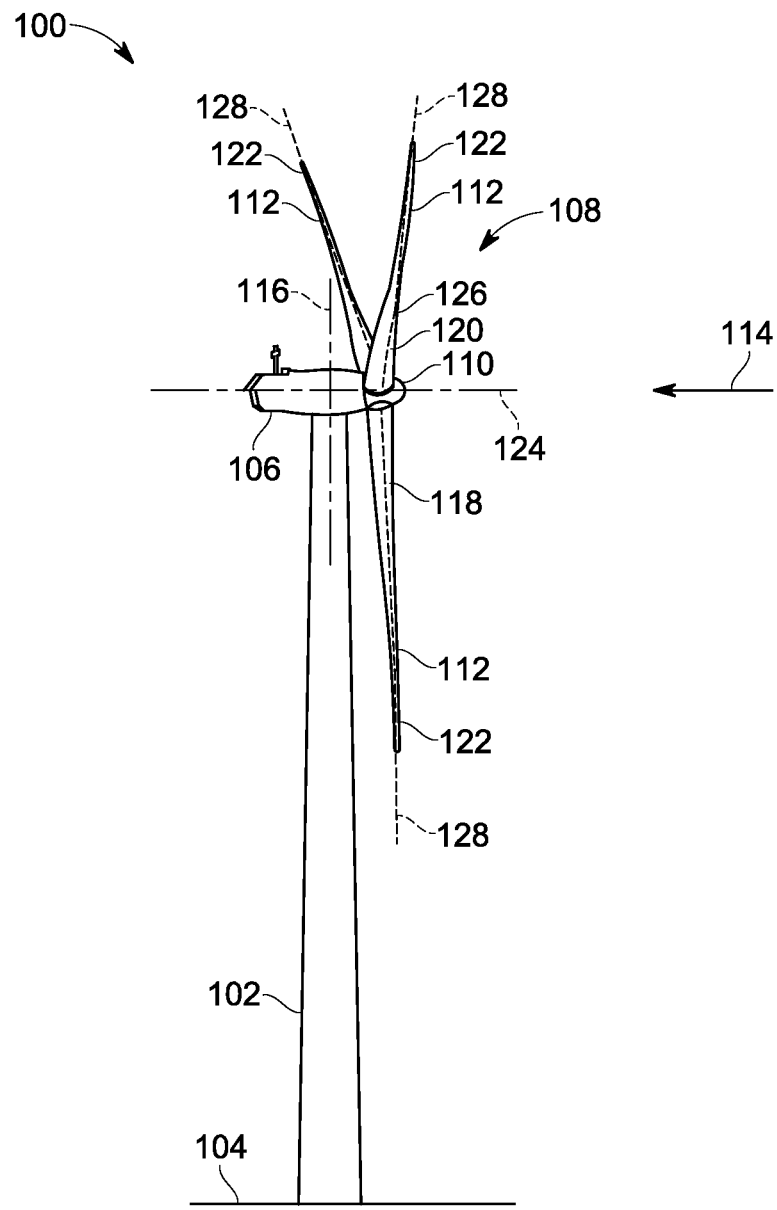
FIG. 1 is perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region (not shown) and a rotor blade load transfer region (not shown). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

Figure 2:
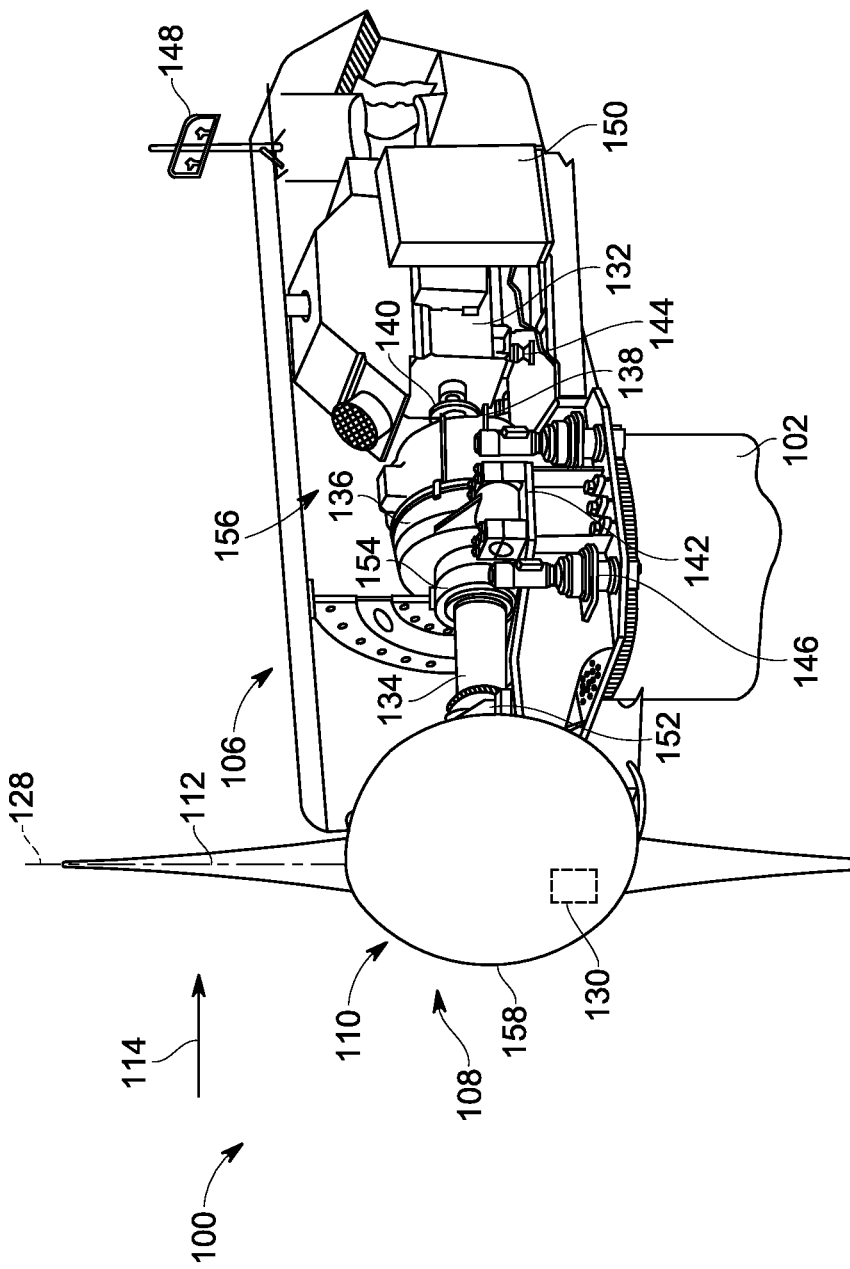
FIG. 2 is a partial sectional view of an exemplary rotor coupled to a nacelle used with the wind turbine shown in FIG. 1.

FIG. 2 is a partial sectional view of nacelle 106 used with wind turbine 100. In the exemplary embodiment, various components of wind turbine 100 are housed in nacelle 106. For example, in the exemplary embodiment, nacelle 106 includes pitch assemblies 130. Moreover, in the exemplary embodiment, rotor 108 is rotatably coupled to an electrical machine 132, for example a generator, positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 uses a dual path geometry to drive high speed shaft 138. Alternatively, rotor shaft 134 may be coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that, in one embodiment, includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
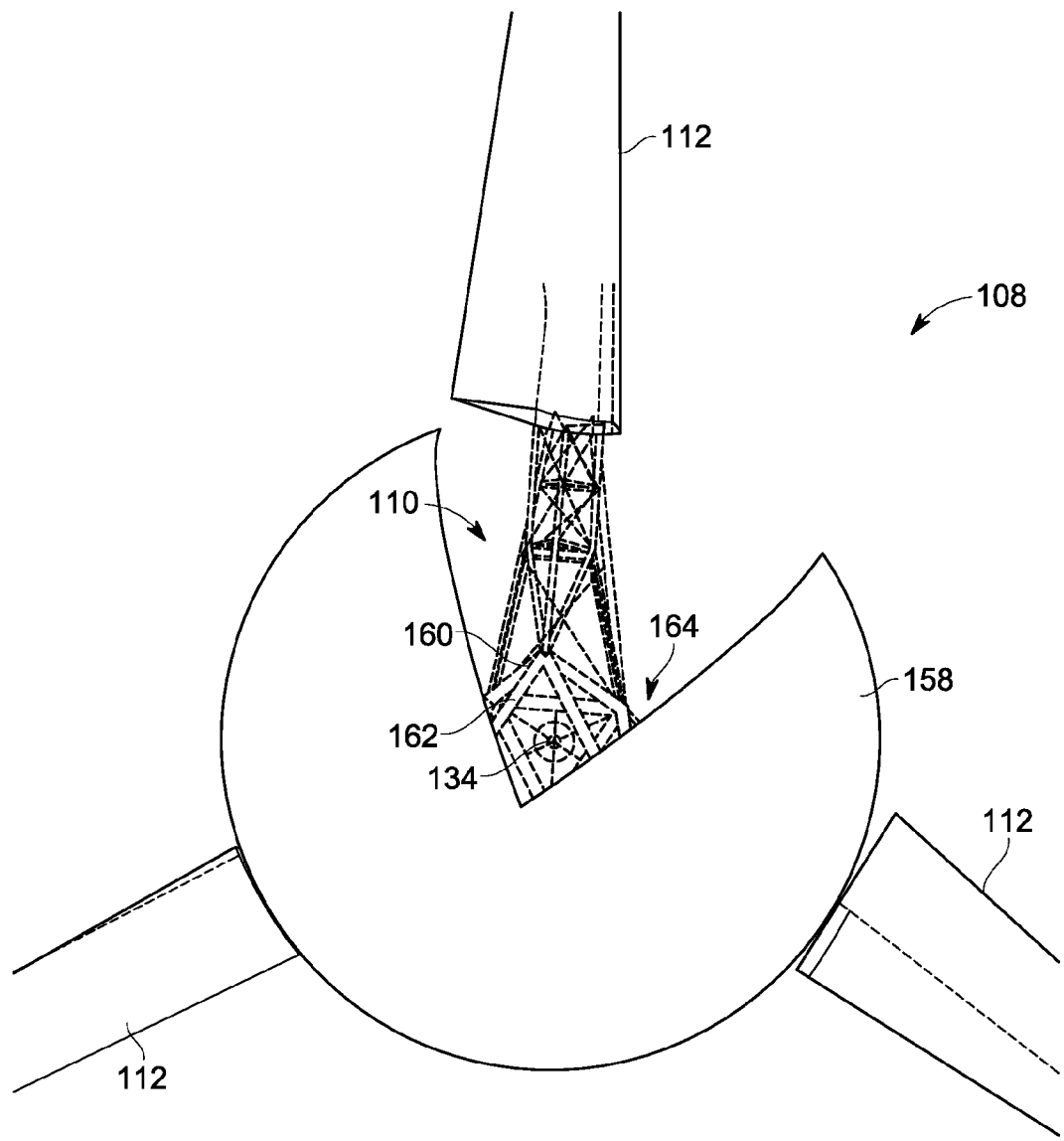
FIG. 3 is a perspective view of an exemplary hub, blades and a dome of the rotor shown in FIG. 2.

FIG. 3 is a perspective view of rotor 108 which includes hub 110, blades 112 and a dome 158 (portions removed for illustrative purposes). Hub 110 is coupled to shaft 134 and dome 158 is coupled to hub 110. In the exemplary embodiment, hub 110 includes a space frame structure 160 which has a truss-like, lightweight rigid configuration formed by interlocking struts 162 in a geometric pattern 164. Space frame structure 160 can include any configuration and/or pattern to enable rotor 108 to function as described herein. Space frame structure 160 is configured to support the plurality of blades 112 away from shaft 134 while minimizing blade length and/or blade mass.

Figure 4:
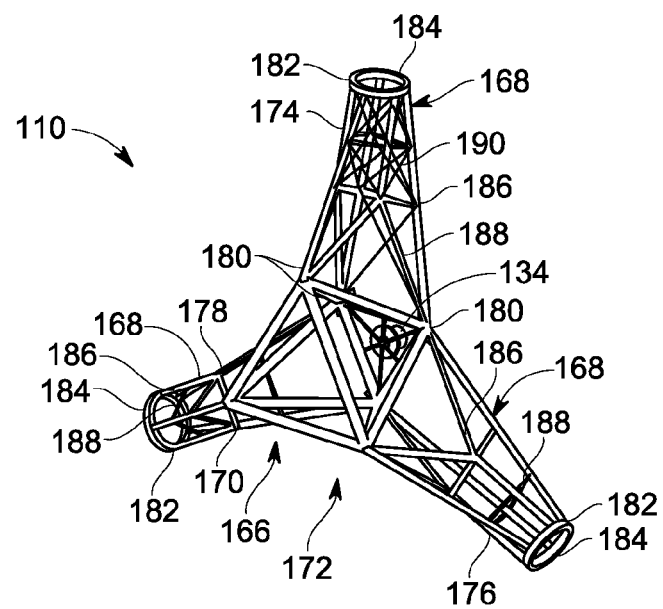
FIG. 4 is a perspective view of the hub, a central portion and a plurality of portions of the hub shown in FIG. 3

FIG. 4 illustrates a perspective view of hub 110 which includes a central portion 166 and a plurality of structural members 168 coupled to central portion 166. Central portion 166 is coupled to shaft 134 and includes a plurality of strut members 170. In the exemplary embodiment, strut members 170 are configured in a space frame configuration having a polyhedron shape 172. More particularly, strut members 170 can be configured in a tetrahedron shape or a square-pyramid shape. Strut members 170 can include any shape to enable central portion 166 to function as described herein. Strut members 170 are configured to provide a lightweight and rigid configuration for supporting structural members 168. Strut members 170 include materials such as, but not limited to, metals, plastics, alloys, composites and combinations thereof. Moreover, strut members 170 can include damping elements (not shown) such as, for example, shock absorbers and damping coatings.

Structural members 168 are coupled to central portion 166 and are configured to radially extend therefrom. In the exemplary embodiment, structural members 168 are radially coupled to central portion 166 and are orientated about 60% from each other. Alternatively, structural members 168 can extend from central portion 166 at any angular relationship. Structural members 168 include a first member 174, a second member 176 and a third member 178. Structural members 168 may include more than three members or less than three members to enable rotor 108 to function as described herein. Each first member 174, second member 176 and third member 178 includes a first end 180 and a second end 182. Second end 182 includes a pitch bearing support ring 184 which is configured to couple to pitch assembly 130 (shown in FIG. 2).

First member 174, second member 176 and third member 178 include a plurality of primary members 186 coupled to first end 180 and second end 182. Each first member 174, second member 176 and third member 178 further includes a plurality of secondary members 188 coupled to the plurality of primary members 186. Primary and secondary members 186 and 188 are configured to provide a lightweight and rigid configuration for supporting blades 112. Moreover, each structural member 168 includes a cross strut member 190 coupled to primary members 186 and secondary members 188. Cross strut member 190 is configured to facilitate tensioning primary member and secondary members 186 and 188. In one embodiment, structural members 168 are aerodynamically shaped to receive wind 114 (shown in FIG. 1) to facilitate rotating shaft 134. More particularly, structural members 168 can include blades and/or vanes (not shown) to receive wind 114 to facilitate rotating shaft 134.

In the exemplary embodiment, primary members 186 are configured in a space frame configuration having a polyhedron shape 172. Moreover, secondary members 188 are configured in a space frame configuration having polyhedron shape 172. Alternatively, primary members and secondary members 186 and 188 can include any shape to enable structural members 168 to function as described herein. Moreover, primary and secondary members 186 and 188 include materials such as, but not limited to, metals, plastics, alloys, composites and combinations thereof. Primary and second members 186 and 188 can include damping elements (not shown) such as, but not limited to, shock absorbers and damping coatings.

Figure 5:
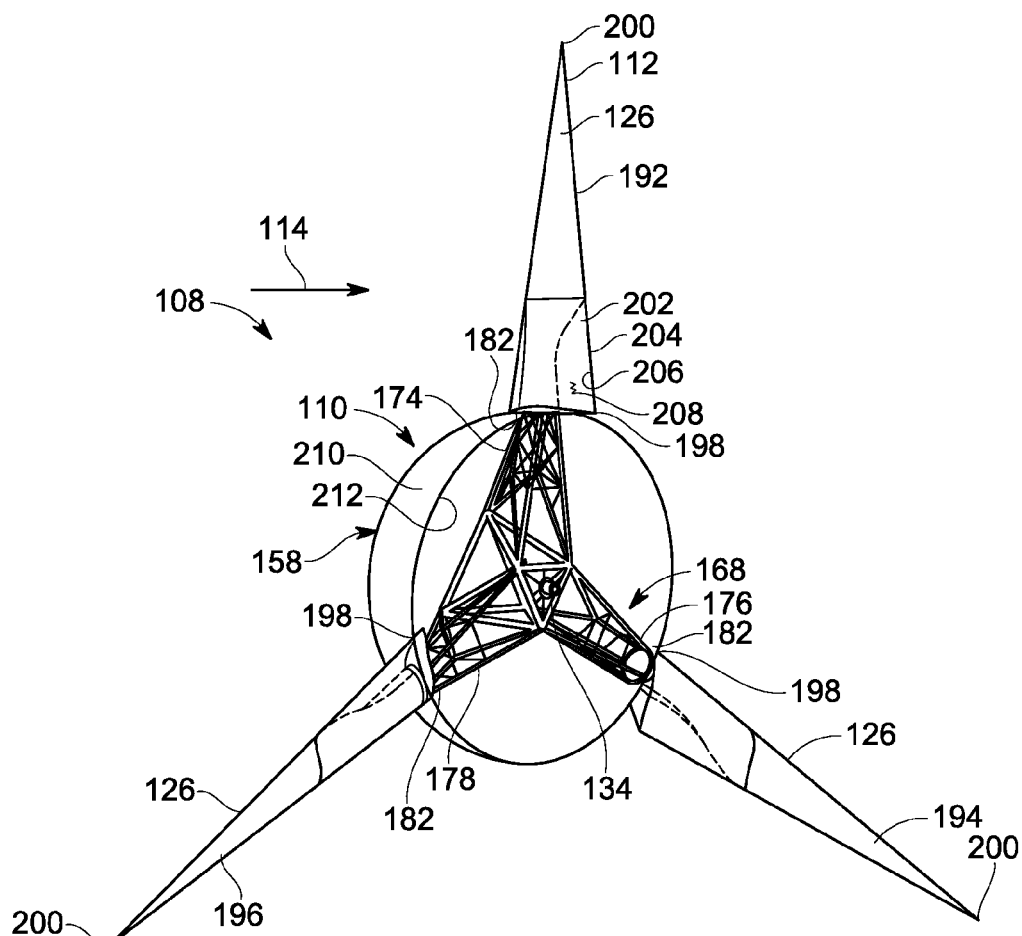
FIG. 5 is another perspective view of the hub, blades and dome shown in FIG. 3.

FIG. 5 is another perspective view of hub 110, blades 112 and dome 158. In the exemplary embodiment, blades 112 are coupled to the plurality of structural members 168. More particularly, blades 112 includes a first blade 192 coupled to first member 174, a second blade 194 coupled to second member 176 and a third blade 196 coupled to third member 178. Blades 112 may include more than three blades 112 or less than three blades 112. Blades 112 may include any number of blades 112 to enable rotor 108 to function as described herein.

First blade 192, second blade 194 and third blade 196 include a root end 198, a tip end 200 and blade surface 126 between root end 198 and tip end 200. Root end 198 is coupled to second end portion 182 of each portion 168 and spaced away from shaft 134. Each blade 192, 194, and 196 further includes an aerodynamic fairing 202 coupled to root end 198. Fairing 202 is configured to receive wind 114 to facilitate rotating shaft 134, wherein each fairing 202 includes an outer surface 204 and an inner surface 206. Outer surface 204 is configured to receive wind 114 to increase aerodynamic lift to facilitate rotating shaft 134. Inner surface 206 defines a void 208 between outer surface 204 and root end 198, wherein void 208 is configured to reduce weight of fairing 202.

Dome 158 is coupled to at least one of first member 174, second member 176 and third member 178. In the exemplary embodiment, dome 158 is semi-circular shaped and configured to direct wind 114 toward fairings 202 to facilitate rotating shaft 134. Alternatively, dome 158 can include other aerodynamic shapes, such as, for example, blades and vanes. Dome 158 can include any shape to enable rotor 108 to function as described herein. Dome 158 includes an outer surface 210 and an inner surface 212, wherein inner surface 212 is coupled to second end 182. Inner surface 212 is positioned adjacent to fairings 202 to facilitate minimizing and/or eliminating air gaps between dome 158 and fairings 202 to maximize directing wind 114 toward fairings 202.

Figure 6:
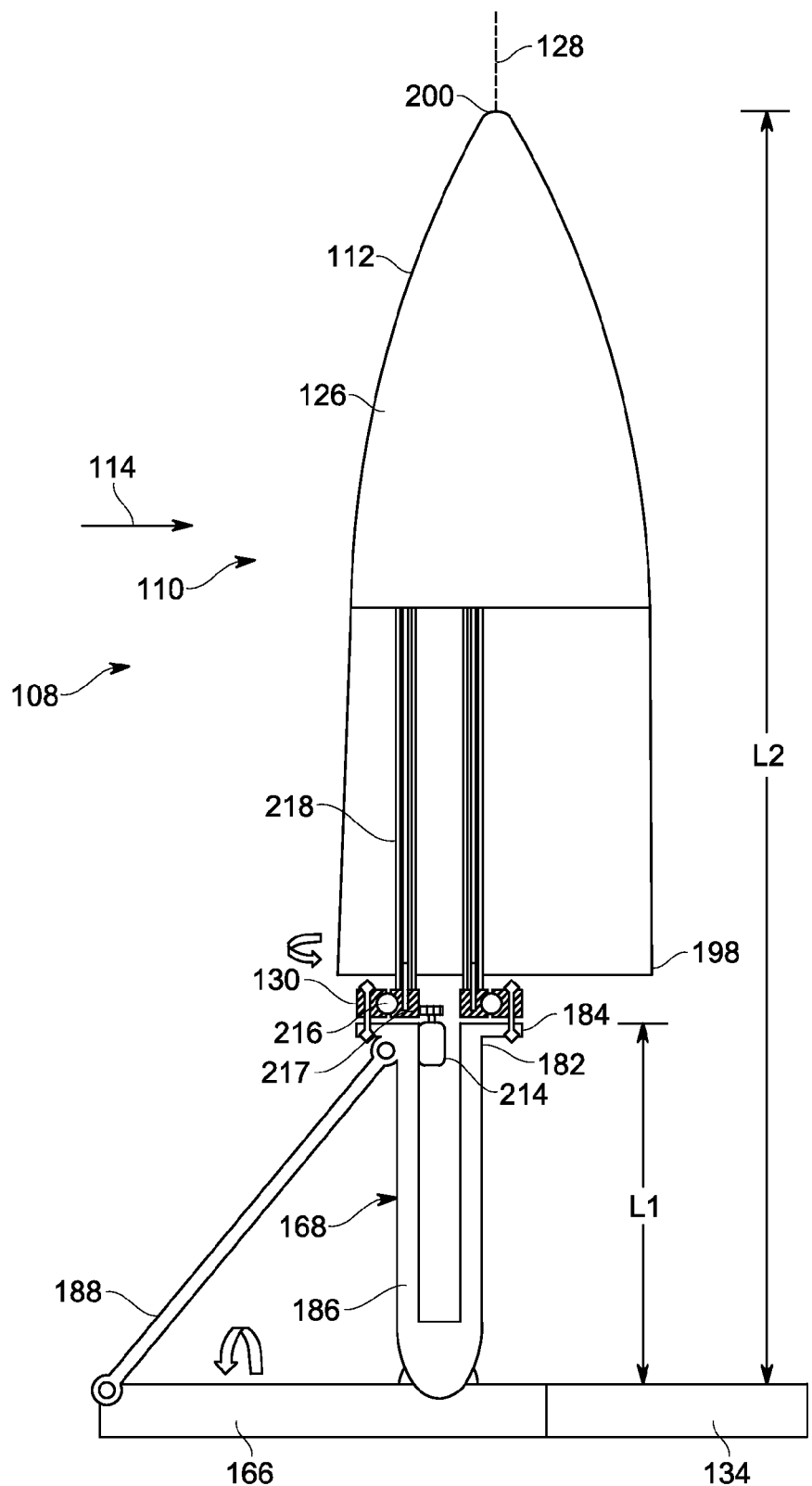
FIG. 6 is a cross sectional view of the hub and a blade shown in FIG. 3.

FIG. 6 illustrates a cross sectional view of hub 110 and blade 112. Pitch assembly 130 is coupled to each blade 112 and each structural member 168, wherein each pitch assembly 130 is configured to modulate a pitch of associated blade 112 about pitch axis 128. In the exemplary embodiment, pitch assembly 130 is coupled to bearing support ring 184 of each second end 182. Pitch assembly 130 includes a pitch motor 214 and a bearing 216, wherein a tube spar 218 of each blade 112 is coupled to a bearing housing 217.

A pitch angle (not shown) of blades 112, i.e., an angle that determines the perspective of blade 112 with respect to the direction of wind 114, may be changed by pitch assembly 130. More specifically, increasing a pitch angle of blade 112 decreases an amount of blade surface area 126 exposed to wind 114 and, conversely, decreasing a pitch angle of blade 112 increases an amount of blade surface area 126 exposed to wind 114. The pitch angles of blades 112 are adjusted about pitch axis 128 at each blade 112. In the exemplary embodiment, the pitch angles of blades 112 are controlled individually. Alternatively, the pitch angles of blades 112 can be controlled in groups.

Each structural member 168 has a first length L1 as measured from second end 182 to shaft 134. Moreover, each blade 112 is spaced from shaft 134 at a second length L2 as measured from tip end 200 to shaft 134. First length L1 is different than second length L2. In the exemplary embodiment, first length L1 is shorter than second length L2. More particularly, first length L1 is about 10% to about 50% of second length L2. In one embodiment, first length L1 is about 20% of second length L2. First and second lengths L2 are sized to facilitate maximizing aerodynamic lift of blades 112 and minimizing blade length and/or blade mass. Moreover, first and second lengths L1 and L2 are sized to minimize blade bending moments and blade tip deflections. Alternatively, first length L1 can be about the same as or longer than second length L2. First and second lengths L1 and L2 can include any size that enables rotor 108 to function as described herein.

Central portion 166 structural members 168 of hub 110 are sized and shaped to increase strength of rotor 108 via primary and secondary members 186 and 188 between blade root ends 198 and shaft 134 to increase efficiency of rotor 108. Central portion 166 and structural members 168 are configured to minimize bending moments at root ends 198 by up to 50% as compared to conventional, cantilevered blades (not shown). Moreover, central portion 166 and structural members 168 are configured to minimize deflection of blade tip ends 200 by up to about 50% as compared to conventional, cantilevered blades. More particularly, central portion 166 and structural members 168 are configured to reduce bending moments at root ends 198 by up to about 30% and deflection of tip ends 200 by up to about 40% as compared to conventional, cantilevered blades.

Figure 7:
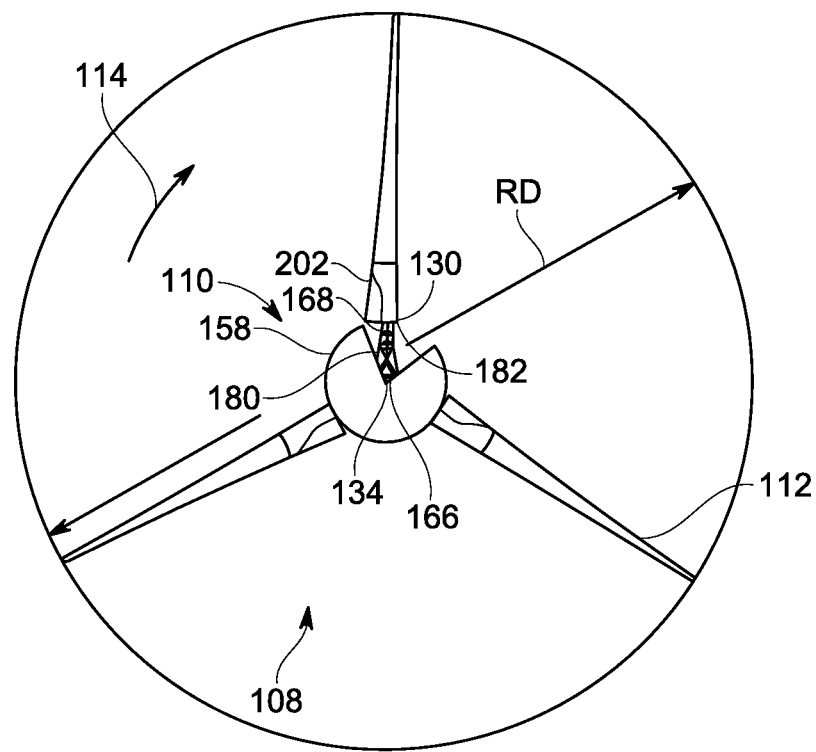
FIG. 7 is a front view of the rotor shown in FIG. 2.

FIG. 7 is a front view of rotor 108 shown in FIG. 3. Since central portion 166 and structural members 168 are configured to extend outward from shaft 134 and support blades 112 away from shaft 134, blade length can be reduced as compared to conventional blades. Moreover, a reduced blade length results in a lighter and less expensive blade to manufacture due to less material. In the exemplary embodiment, portion first length L1 (shown in FIG. 6) is about 20% of second length L2 (shown in FIG. 6) to facilitate reducing blade length. Reduced blade length results in a lighter and less expensive pitch assembly 130 needed due to lesser loads applied by blades 112 to pitch assembly 130, and in particular, pitch assembly bearing 216. Moreover, pitch assembly 130 is coupled to second end 182 where blade bending moments are up to about 50% less as compared to blade bending moments at first end 180. Since pitch assembly 130 is coupled to second end 182 and experiences less bending moments, pitch assembly 130 is lighter and less expensive.

Second length L2 reduces material cost, manufacturing cost, transportation costs and/or installation costs for blades 112 while reducing up-tower mass. With space frame hub 110 extending from shaft 134, rotor diameter RD is substantially the same as compared to conventional rotor diameters (not shown) while rotor 108 includes reduced sized blades 112. Alternatively, rotor diameter RD can be increased by using conventional blades (not shown) since space frame hub 110 extends blades 112 beyond shaft 134. In the exemplary embodiment, dome 158 is sized from about 10% to about 30% of rotor diameter RD. More particularly, dome 158 is sized up to about 20% of rotor diameter RD. Dome 158 can be any size to enable rotor 108 to function as described herein. Dome 158 is sized and shaped to direct wind 114 toward fairing 202. Alternatively, dome 158 can be removed to expose aerodynamically shaped portions 168 which are configured to receive wind 114 to facilitate rotating shaft 134.

Figure 8:
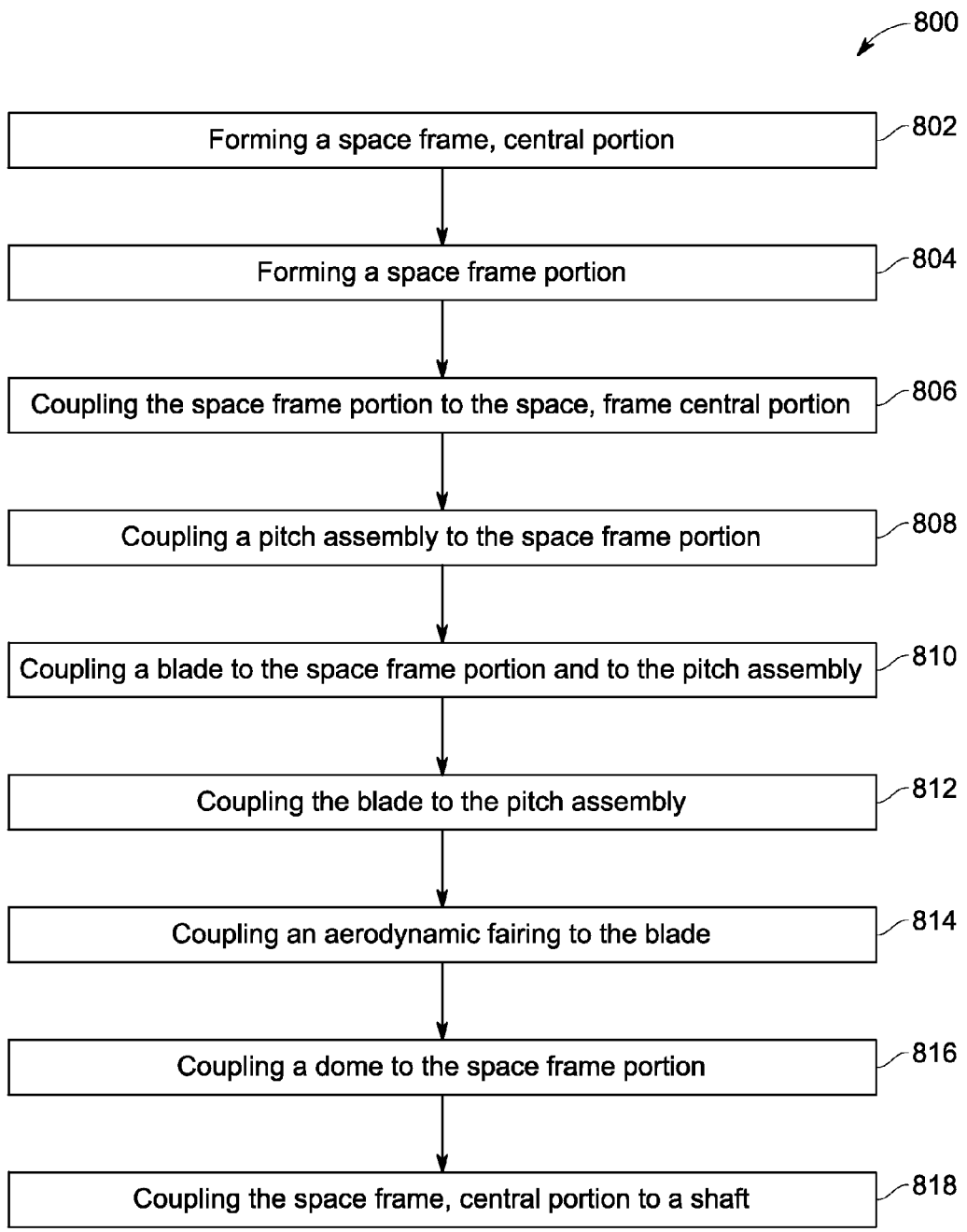
FIG. 8 illustrates an exemplary flowchart illustrating a method of assembling a rotor of a wind turbine.

FIG. 8 illustrates an exemplary flowchart illustrating a method 800 of assembling a rotor, for example rotor 108 (shown in FIG. 3). Method 800 includes forming 802 a space frame central portion, for example central portion 166 (shown in FIG. 4), from a plurality of struts, such as struts 170 (shown in FIG. 4). In the exemplary method 800, the space frame portion is formed into a polyhedron shape, for example polyhedron shape 162 (shown in FIG. 3). A space frame portion, such as space frame portion 168 (shown in FIG. 4), is also formed 804 from a plurality of members, for example members 186 and 188 (shown in FIG. 4). The space frame portion includes a first member, a second member and a third member, for example first member 174, second member 176 and third member 178 (shown in FIG. 4). The space frame portion is coupled 806 to the space frame central portion. Method 800 includes coupling 808 a pitch assembly, for example pitch assembly 130 (shown in FIG. 6), to each member.

Method 800 includes coupling 810 a blade, such as blade 112 (shown in FIG. 3), to the space frame portion. In the exemplary embodiment, blade includes a first blade, a second blade and a third blade, for example first blade 192, second blade 194 and third blade 196 (shown in FIG. 3), which are coupled to the first member, the second member and the third member respectively. Moreover, the blade is coupled 812 to the pitch assembly.

In the exemplary embodiment, method 800 includes coupling 814 an aerodynamic fairing, for example fairing 202 (shown in FIG. 3), to the blade. More particularly, fairing is coupled to a root end, for example root end 198 (shown in FIG. 3), of the blade. Moreover, method 800 includes coupling 816 a dome, such as dome 158 (shown in FIG. 5), to the space frame portion. More particularly, dome is coupled to a second end, for example second end 182 (shown in FIG. 3). Method 800 further includes coupling 818 the central portion to a shaft, for example shaft 134 (shown in FIG. 5).

The embodiments described herein relate to a rotor configured to enhance aerodynamic efficiency of a wind turbine to increase higher energy conversion. The embodiments described herein reduce manufacturing costs, transportation costs and/or installation costs. Moreover, the embodiments described herein reduce blade bending moments and/or blade tip deflection and/or loads applied to turbine components such as pitch assemblies and yaw assemblies.

A technical effect of the systems and methods described herein includes at least one of: a rotor having a space frame hub having a central portion coupled to the shaft and a first member coupled to the central portion, wherein the first member has a first length; and a first blade coupled to the first member and having a second length that is longer than the first length.

Exemplary embodiments of a rotor and methods for assembling the rotor are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor for coupling to a rotating shaft, said rotor comprising:
   a space frame hub comprising a central portion fixedly coupled to the rotating shaft and a first structural member coupled to said central portion, wherein said rotating shaft is fixedly coupled to the central portion without extending therethrough, said first structural member having a first length; and
   a first blade coupled to said first structural member and having a tip end spaced from the shaft at a second length that is longer than said first length.

2. The rotor of claim 1, wherein said central portion comprises a plurality of interlocking strut members in a polyhedron shape.

3. The rotor of claim 1, wherein said first structural member comprises a plurality of interlocking primary members and a plurality of interlocking secondary members.

4. The rotor of claim 1, wherein said first structural member is aerodynamically shaped.

5. The rotor of claim 1, further comprising a second structural member and a third structural member coupled to said central portion.

6. The rotor of claim 1, further comprising a second structural member and a third structural member coupled to said central portion and a second blade coupled to said second structural member and a third blade coupled to said third structural member.

7. The rotor of claim 1, wherein said first length is about 10% to about 40% of said second length.

8. The rotor of claim 1, wherein said first blade comprises an aerodynamic fairing.

9. The rotor of claim 1, further comprising a semi-circular dome coupled to said first structural member.

10. The rotor of claim 1, further comprising a pitch assembly coupled to said first structural member and said first blade.

11. A wind turbine, comprising:
    a tower;
    a nacelle coupled to said tower;
    a shaft rotatably coupled to said nacelle; and
    a rotor fixedly coupled to said shaft, said rotor comprising:
       a space frame hub comprising a central portion coupled to the shaft, wherein said shaft is fixedly coupled to the central portion without extending therethrough;
       a plurality of structural members coupled to said central portion, each member of said plurality of structural members having a first length;
       a plurality of blades, each blade of said plurality of blades coupled to a respective structural member of said plurality of structural members and each blade having a tip end spaced from said shaft at a second length that is longer than said first length; and
       a pitch assembly coupled to each structural member of said plurality of structural members and to each blade of said plurality of blades.

12. The wind turbine of claim 11, wherein said central portion comprises a plurality of interlocking structural members in a tetrahedron pattern.

13. The wind turbine of claim 11, wherein each member of said plurality of structural members is aerodynamically shaped.

14. The wind turbine of claim 11, said first length is about 10% to about 40% of said second length.

15. The wind turbine of claim 11, wherein said first length is measured from an end of each said structural member of said plurality of structural members to the shaft and said second length is measured from a tip end of each said blade of said plurality of blades to the shaft and said first length is about 10% to about 40% of said second length.

16. The wind turbine of claim 11, wherein each blade of said plurality of blades comprises a root end and an aerodynamic fairing coupled to said root end.

17. The wind turbine of claim 11, wherein each structural member includes a first end and a second end and said pitch assembly is coupled to said second end.

18. A method of assembling a rotor to a rotating shaft, said method comprising:
- radially coupling a space frame portion to a space frame, central portion;
- coupling a pitch assembly to the space frame portion;
- coupling a blade to the space frame portion and to the pitch assembly; and
- axially coupling the space frame, central portion to the rotating shaft, wherein said central portion is fixedly coupled to the rotating shaft without extending therethrough.

19. The method of claim 18, further comprising coupling a semi-circular dome to the space frame portion.

20. The method of claim 18, further comprising coupling an aerodynamic fairing to the blade.

\* \* \* \* \*